Aug. 11, 1964 S. KRIZMAN 3,144,260
TRUNNION FOR FRONT WHEEL SUSPENSION
Filed April 16, 1963 2 Sheets-Sheet 1

INVENTOR.
STEVE KRIZMAN
BY Hobbs & Easton
ATTORNEYS

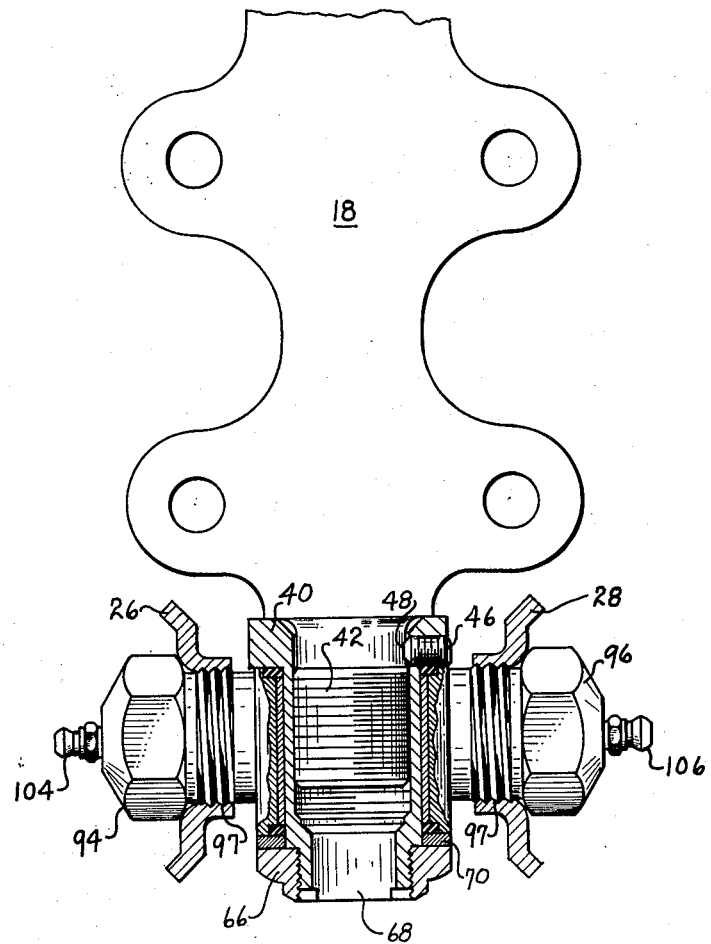

United States Patent Office 3,144,260
Patented Aug. 11, 1964

3,144,260
TRUNNION FOR FRONT WHEEL SUSPENSION
Steve Krizman, South Bend, Ind., assignor to Krizman Manufacturing Co., Inc., South Bend, Ind., a corporation of Indiana
Filed Apr. 16, 1963, Ser. No. 273,521
7 Claims. (Cl. 280—96.1)

The present invention relates to trunnions, and more particularly to a trunnion for automobile front wheel suspension.

In some present day automobiles, the front wheel suspension consists of a trunnion pin supported at its upper and lower ends by A-arms and connected to the two A-arms by trunnions, which permits the front wheel which is mounted on the trunnion pin to swing freely forwardly and rearwardly as it is moved by the steering mechanism. The trunnion pin is usually secured directly to the rear side of the brake drum and moves in a vertical position upwardly and downwardly with free ends of the A arms as the wheel responds or reacts to bumps, chuck holes and other unevenness in the road or highway, and to variations and shifts in the load on the vehicle. Since the trunnions are constantly subjected to the oscillating steering movement and vertical adjustment to road and load variations, as well as severe road jarring and vibration, excessive wear frequently takes place in the trunnion bearing which has, in the past, necessitated major repair operations or replacement of the entire trunnion pin and trunnion assembly. It is therefore one of the principal objects of the present invention to provide a trunnion assembly which can be mounted on the worn trunnion pin as a replacement for the original trunnion without repairing or reworking the trunnion pin or the connecting arms or links therefor, and which can easily and readily be substituted for the original trunnion with a minimum amount of labor, and with no drilling, boring or other machining operation being required to make the complete trunnion replacement installation.

Another object of the invention is to provide a relatively simple, easily installed bearing assembly for the lower trunnion of an automobile front wheel suspension of the A arm type, which can be firmly secured to the lower end of the trunnion pin regardless of its worn condition, and which provides effectively lubricated new bearing surfaces for the pin and connections to the two A arms.

Still another object of the invention is to provide a trunnion assembly for a front wheel suspension of the aforesaid type which can be fabricated from standard, readily available materials using standard machining tools and epuipment, and which can be assembled without first making any modifications or changes in the original pin and A arm construction.

A further object is to provide a long wearing, highly reliable trunnion assembly of the aforesaid type which, aside from an occasional lubrication, requires no adjustments or other attention, and which is permanently installed and will give satisfactory service for the normal life of the vehicle.

Additional objects of the present invention will become apparent from the following description and accompanying drawings, wherein:

FIGURE 2 is an elevational and partial cross sectional view of the trunnion pin and lower trunnion of the front wheel suspension shown in FIGURE 1;

Figure 1:
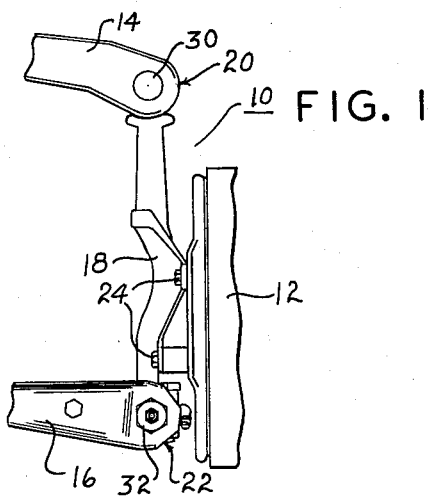
FIGURE 1 is a fragmentary view of the front wheel suspension of an automobile wherein the trunnion embodying the present invention is incorporated therein.
Figure 5:
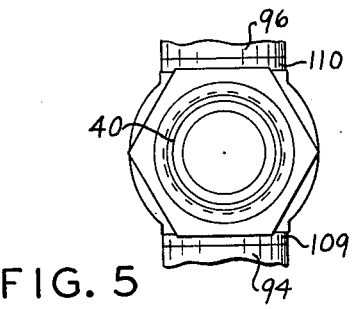
FIGURE 5 is a fragmentary top plan view of the trunnion shown in FIGURES 2, 3 and 4.

Referring more specifically to the drawings and to FIGURE 1 in particular, numeral 10 designates the front wheel suspension of an automobile, numeral 12 a brake drum of the front wheel (not shown), 14 the upper A arm of the suspension, 16 the lower A arm, 18 the trunnion pin connected to the upper A arm by a trunnion 20 and to the lower A arm by trunnion 22. The trunnion pin is secured to the rear side of the brake drum by a plurality of bolts 24 extending through flanges on the trunnion pin into the rear plate of the brake drum. The construction of the front wheel suspension may be, for the purpose of the present invention, considered conventional or standard, and, since this construction is well known in the automotive field, the details thereof will not be set forth herein. The lower A arm consists of two arms 26 and 28 extending inwardly from the front wheel which oscillates forwardly and rearwardly on trunnion pin 18 rotating in the two trunnions 20 and 22. The front wheel suspension adjusts itself to variations in load on the vehicle and road conditions such as, for example, bumps, chuck holes and similar surface unevenness, by pivoting at nuts or studs 30 and 32 at the upper A arm 14 and lower A arm 16, respectively.

Figure 6:
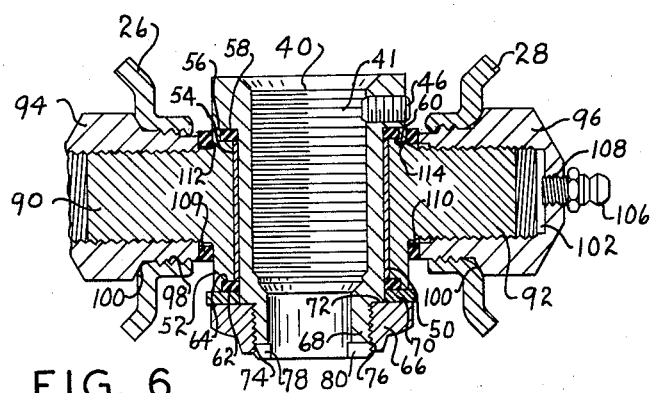
FIGURE 6 is a vertical cross sectional view of the trunnion assembly shown in the preceding figures, the section being taken on line 6—6 of FIGURE 3.
Figure 3:
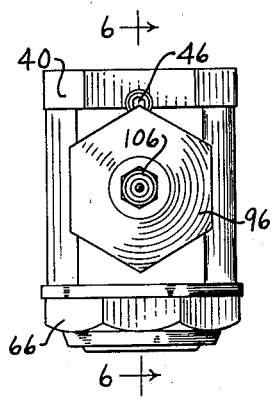
FIGURE 3 is an elevational view of one end of the trunnion assembly shown in FIGURE 2, showing the trunnion assembly removed from the trunnion pin.
Figure 4:
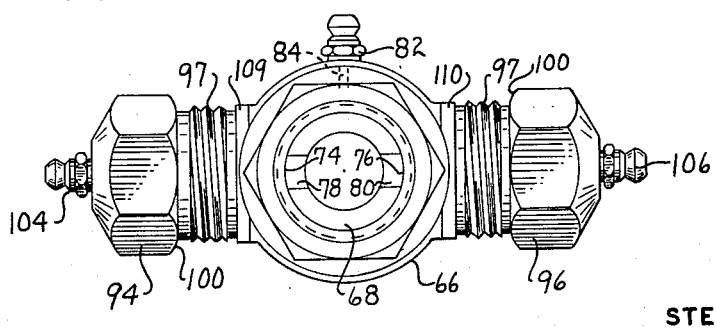
FIGURE 4 is a bottom view of the trunnion assembly shown in FIGURE 3.

The construction of the present trunnion assembly is best shown in the cross sectional view of FIGURE 6, consisting of a sleeve nut 40 having an internal threaded portion 41 for threading onto the threaded lower end 42 of the trunnion pin 18. Since the threads on the trunnion pin and sleeve nut are relatively coarse, a substantial amount of wear may have occurred on the trunnion pin's threaded end without causing any serious difficulty in properly securing the sleeve nut onto the trunnion pin end. When the sleeve nut has been assembled on the threaded lower end of the trunnion pin, the nut is locked in place by a set screw 46 extending through the side of the nut and engaging end 42 in recess 48 of the trunnion pin. The external surface of the nut is smooth and cylindrical, and a bronze bearing sleeve 50 is assembled thereon, and a body member 52 having a central bore 54 is assembled over sleeve 50, the sleeve and body member seating against a shoulder 56 on the upper end of sleeve nut 40 with a gasket 58 interposed between the upper end of the sleeve and the shoulder. Gasket 58 is seated in a groove 60 at the upper edge of body member 52 and a second gasket 62 seats in a groove 64 in the lower edge of the body member, thus sealing sleeve 50 at its upper and lower edges to prevent seepage of lubricant therefrom.

The entire assembly, consisting of the sleeve 50 and body member 52, is secured on sleeve nut 40 by a nut 66 threaded onto the reduced lower end 68 of the sleeve nut and seating against a washer 70 interposed between the nut and the lower end of body member 52. After the nut 66 has been threaded onto the threaded end 68 until it seats against a shoulder 72, nut 66 is staked at points 74 and 76 by deflecting a portion of the nut into slots 78 and 80, respectively, of reduced end portion 68, thereby preventing rotation and loosening of the nut on the reduced end portion. A lubricating fixture 82 is threaded into a lubricating bore 84 extending through body member 52 to the external surface of bushing 50, the fixture being of standard construction and adapted to receive standard lubricating service equipment.

Body member 52 is provided with two threaded diametrically disposed bosses 90 and 92 for receiving nuts 94 and 96, respectively. The threaded bosses and respective nuts are adapted to constantly rotate relative to one another and to support A arms 26 and 28, respectively. Each nut 94 and 96 with external threaded portion 97 is threaded through a hole 98 in the respective A arm, and a shoulder 100 on each nut seats firmly against the respective external surface of the A arm and holds the nut firmly in engagement with the arm. As the trunnion pin moves in vertical position upwardly and downwardly, nuts 94 and 96, which do not seat tightly on the bosses, rotate a fraction of a revolution on the respective bosses. The socket of the nuts is somewhat longer than the bosses, thus providing a lubricant reservoir 102 at the outer end of the two bosses. Lubricating fixtures 104 and 106 are threaded in a bore 108 of each nut and provide access to the respective reservoirs for the lubricant injected therein by the lubricating service equipment. The inner ends of the threaded portions of bosses 90 and 92 and the respective nuts are sealed by gaskets 109 and 110, engaging the inner ends of the two nuts and annular shoulders 112 and 114 of body member 52.

In installing the present trunnion assembly on the trunnion pin in the replacement of a worn trunnion, the arms 26 and 28 of the lower A arm are removed from the original trunnion and the trunnion removed from the lower end of the trunnion pin. The sleeve nut 40 of the present trunnion is then threaded onto the trunnion pin and secured in place by tightening set screw 46. Body member 52 is then slipped over sleeve nut 40 with bearing sleeve 50 therebetween and the two gaskets 58 and 62 assembled in grooves 60 and 64, respectively, and nut 66 is threaded onto the reduced end 68 with washer 70 interposed between the inner edge of the nut and the adjacent edge of body member 52. After nut 66 has been tightened in place against shoulder 72, it is staked by deflecting the outer edge thereof into one or both of slots 78 and 80. Nuts 94 and 96 are then threaded into the holes through the respective A arms 26 and 28 and onto bosses 90 and 92 until they seat against gaskets 109 and 110. The assembly is then lubricated using lubricating fixtures 82, 104 and 106, thus preparing the trunnion assembly for long, uninterrupted and reliable service.

While only one embodiment of the present invention has been described in detail herein, various changes and modifications may be made without departing from the scope of the invention.

I claim:

1. A trunnion for a front wheel suspension having a trunnion pin with a threaded lower end and a pair of arms forming an A arm and having holes therethrough, comprising a sleeve nut having a cylindrical external surface with a shoulder near its upper edge and a threaded internal surface for engagement with the threads on the trunnion pin, said sleeve nut having a threaded reduced diameter portion on the end opposite said shoulder, a shoulder on said sleeve nut between said reduced diameter portion and cylindrical surface, a set screw extending through said sleeve nut for locking said nut on the trunnion pin, a body member with a cylindrical bore therethrough and an annular groove at each end disposed around said sleeve nut and seated against said first mentioned shoulder and having two diametrically disposed, radially extending threaded bosses, gaskets seated in said grooves, a nut threaded onto said reduced diameter portion for retaining said body member on said sleeve nut, a bearing sleeve disposed between said cylindrical surface and said body member in said bore, a nut having a closed end threaded onto each boss and having a threaded external surface for extending through the hole in the respective arm and retaining said arms on said bosses, a washer disposed between the nut on the reduced diameter portion and the adjacent portion of said body member, a lubricating fixture in the closed end of each said nuts on said bosses, and a lubricating fixture in said body member communicating with said bore.

2. A trunnion for a front wheel suspension having a trunnion pin with a threaded lower end and a pair of arms forming an A arm and having holes therethrough, comprising a sleeve nut having a cylindrical external surface with a shoulder near its upper edge and a threaded internal surface for engagement with the threads on the trunnion pin, said sleeve nut having a threaded reduced diameter portion on the end opposite said shoulder, a shoulder between said reduced diameter portion and cylindrical surface, a body member with a cylindrical bore therethrough and an annular groove at each end disposed around said sleeve nut and seated against said first mentioned shoulder and having two diametrically disposed radially extending threaded bosses, gaskets seated in said grooves, a nut threaded onto said reduced diameter portion for retaining said body member on said sleeve nut, a bearing sleeve disposed between said cylindrical surface and said body member in said bore, a nut having a closed end threaded onto each boss and having a threaded external surface for extending through the hole in the respective arm and retaining said arms on said bosses, and a washer disposed between the nut on said reduced diameter portion and the adjacent end of said body member.

3. A trunnion for a front wheel suspension having a trunnion pin with a threaded end and a pair of arms with holes therethrough, comprising a sleeve nut having a cylindrical external surface with a shoulder near its upper edge and a threaded internal surface for engagement with the threads on the trunnion pin, said sleeve nut having a threaded reduced diameter portion on the end opposite said shoulder, a shoulder between said reducer diameter portion and cylindrical surface, a body member having a cylindrical bore therethrough around said sleeve nut and seated against said first mentioned shoulder and having two diametrically disposed radially extending threaded bosses, a nut threaded onto said reduced diameter portion for retaining said body member on said sleeve nut, a bearing sleeve disposed between said cylindrical surface and said body member in said bore, a nut having a closed end threaded onto each boss and having a threaded external surface for extending through the hole in the respective arm and retaining said arm on said bosses, and sealing means disposed between said last mentioned nuts and the adjacent portion of said body member.

4. A trunnion for a front wheel suspension having a trunnion pin with a threaded end and a pair of arms with holes therethrough, comprising a sleeve nut having a cylindrical external surface and a threaded internal surface for engagement with the threads on the trunnion pin, said sleeve nut having a threaded reduced diameter portion at one end, a body member with a cylindrical bore therethrough mounted on said sleeve nut and having two diametrically disposed radially extending threaded bosses, a nut threaded onto said reduced diameter portion for retaining said body member on said sleeve nut, a nut having a closed end threaded onto each boss and having a threaded external surface for extending through the hole in the respective arm and retaining said arms on said bosses, a lubricating fixture in the closed end of each of said nuts on said bosses, and a lubricating fixture in said body member communicating with said bore.

5. A trunnion for a front wheel suspension having a trunnion pin with a threaded end and a pair of arms with holes therethrough, comprising a sleeve nut having a cylindrical external surface and a threaded internal surface for engagement with the threads on the trunnion pin, said sleeve nut having a threaded reduced diameter portion on the end opposite said shoulder, a body member with a cylindrical bore therethrough mounted on said sleeve nut and having two diametrically disposed radially extending threaded bosses, a nut threaded onto said reduced diameter portion for retaining said body member on said sleeve nut, and a nut having a closed end threaded onto each boss and having a threaded external surface for extending through the hole in the respective arm and retaining said arms on said bosses.

6. A trunnion for a front wheel suspension having a trunnion pin with a threaded end and a pair of arms with holes therethrough, comprising a sleeve nut having a cylindrical external surface and a threaded internal surface for engagement with the threads on the trunnion pin, said sleeve nut having a threaded reduced diameter portion on one end, a body member with a cylindrical bore therethrough mounted on said sleeve nut and having two diametrically disposed radially extending threaded bosses, a nut threaded onto said reduced diameter portion for retaining said body member on said sleeve nut, and a nut threaded onto each boss and having a threaded external surface for extending through the hole in the respective arm and retaining said arms on said bosses.

7. A trunnion for a front wheel suspension having a trunnion pin with a threaded end and a pair of arms with holes therethrough, comprising a sleeve nut having a cylindrical external surface and a threaded internal surface for engagement with the threads on the trunnion pin, said sleeve nut having a threaded reduced diameter portion on one end, a body member with a cylindrical bore therethrough mounted on said sleeve nut and having two diametrically disposed radially extending threaded bosses, a nut threaded onto said reduced diameter portion for retaining said body member on said sleeve nut, and a nut threaded onto each boss for extending through the hole in the respective arm and retaining said arms on said bosses.

References Cited in the file of this patent
UNITED STATES PATENTS

| | | |
|---|---|---|
| 2,115,918 | Slack | May 3, 1938 |
| 2,449,306 | Leighton | Sept. 14, 1948 |
| 2,635,895 | Wahlberg | Apr. 21, 1953 |
| 2,684,253 | Leighton | July 20, 1954 |
| 2,793,048 | Adloff | May 21, 1957 |